United States Patent
Jang et al.

(10) Patent No.: US 11,130,877 B2
(45) Date of Patent: Sep. 28, 2021

(54) COATING MATERIAL FOR COATING LAYER OF INJECTION MOLD AND METHOD OF MANUFACTURING COATING LAYER OF INJECTION MOLD

(71) Applicants: Hyundai Motor Company, Seoul (KR); Kia Motors Corporation, Seoul (KR); Noroo Bee Chemical Co., Ltd., Chungcheongnam-do (KR); Moltex Co., Ltd., Gyeonggi-do (KR)

(72) Inventors: Kyeong Hoon Jang, Seoul (KR); In Soo Han, Gyeonggi-do (KR); Dae Sik Kim, Gyeonggi-do (KR); Jae Hyun An, Chungcheongnam-do (KR); Seul Yi, Seoul (KR); Ik Jin Jung, Gyeonggi-do (KR); Ju Seong Park, Gyeonggi-do (KR); Soon Joon Jung, Seoul (KR); Seung Sik Han, Gyeonggi-do (KR); Jae Beom Ahn, Gyeonggi-do (KR); Yong Chul Lee, Chungcheongnam-do (KR); Kie Moon Sung, Gyeonggi-do (KR); Soon Gi Kim, Chungcheongnam-do (KR); Hak Soon Choi, Chungcheongnam-do (KR)

(73) Assignees: Hyundai Motor Company, Seoul (KR); Kia Motors Corporation, Seoul (KR); Noroo Bee Chemical Co., Ltd., Chungcheongnam-do (KR); Moltex Co., Ltd., Gyeonggi-do (KR)

( * ) Notice: Subject to any disclaimer, the term of this patent is extended or adjusted under 35 U.S.C. 154(b) by 49 days.

(21) Appl. No.: 16/180,671

(22) Filed: Nov. 5, 2018

(65) Prior Publication Data
US 2020/0017705 A1    Jan. 16, 2020

(30) Foreign Application Priority Data
Jul. 11, 2018   (KR) .................. 10-2018-0080735

(51) Int. Cl.
*B29C 33/56*   (2006.01)
*C09D 133/02*   (2006.01)
*C09D 133/08*   (2006.01)
*B29L 31/30*   (2006.01)

(52) U.S. Cl.
CPC ............ *C09D 133/02* (2013.01); *B29C 33/56* (2013.01); *C09D 133/08* (2013.01); *B29L 2031/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0356618 A1* | 12/2014 | Hosoda | ............... | C09D 133/04 428/336 |
| 2015/0079295 A1* | 3/2015 | Jeong | ............... | C09D 133/066 427/385.5 |
| 2016/0024327 A1* | 1/2016 | Ookawa | ............... | C09D 133/00 523/458 |
| 2017/0096580 A1* | 4/2017 | Lee | ............... | C09D 175/06 |

FOREIGN PATENT DOCUMENTS

| CN | 104139645 A | 11/2014 |
|---|---|---|
| KR | 1019930012262 | 7/1993 |

* cited by examiner

*Primary Examiner* — Jose I Hernandez-Kenney
(74) *Attorney, Agent, or Firm* — Mintz Levin Cohn Ferris Glovsky and Popeo, P.C.; Peter F. Corless

(57) ABSTRACT

Disclosed is a coating material for a coating layer of an injection mold, the coating material including 100 parts by weight of a resin composition and about 30 to 40 parts by weight of a curing agent. The resin composition includes an amount of about 40 to 50 wt % of a first acrylic resin, an amount of about 5 to 15 wt % of a second acrylic resin having a weight average molecular weight less than a weight average molecular weight of the first acrylic resin, an amount of about 10 to 15 wt % of a carbon component, an amount of about 0.5 to 2 wt % of a matting agent, an amount of about 0.1 to 0.3 wt % of a catalyst and an amount of about 20 to 35 wt % of a solvent, all the wt % are based on the total weight of the resin composition.

18 Claims, 1 Drawing Sheet

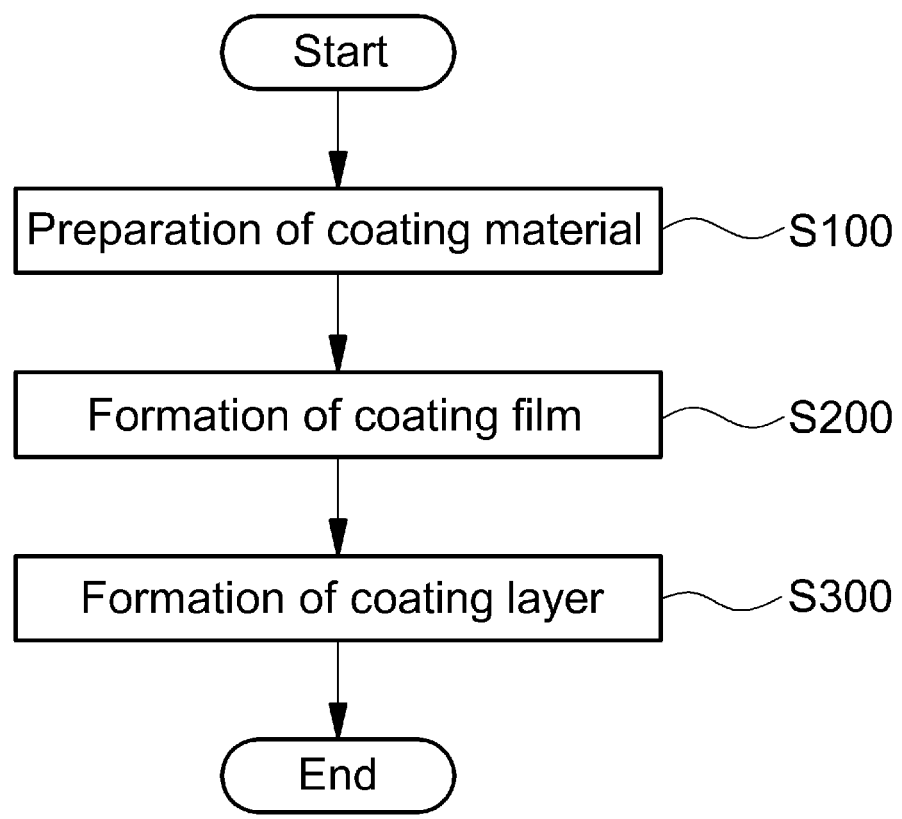

COATING MATERIAL FOR COATING LAYER OF INJECTION MOLD AND METHOD OF MANUFACTURING COATING LAYER OF INJECTION MOLD

CROSS REFERENCE TO RELATED APPLICATION

The present application claims priority to Korean Patent Application No. 10-2018-0080735, filed Jul. 11, 2018, the entire contents of which is incorporated herein for all purposes by this reference.

TECHNICAL FIELD

The present invention relates to a coating composition for forming a coating layer of an injection mold and a method of manufacturing a coating layer of an injection mold using the same. The coating composition may be suitable for use in injection of interior or exterior parts for vehicles.

BACKGROUND OF THE INVENTION

Reduction in the weight of a vehicle is closely associated with fuel efficiency. In order to realize weight reduction, for example, a metal part in a vehicle has been replaced with a plastic material, and thus, plastic materials have been increasingly applied to a variety of fields including interior or exterior parts for vehicles.

At a same time, cost reduction and quality improvement may also be required, as well as reduction in the weight of the vehicle. For interior parts, the injected products have many defects, such as whitening, ghost marks, gas marks, scratches, and the like, and the defects of the injected products may be covered by coating with a coating material. The coated parts may be improved in outer appearance and various colors and textures may be realized. However, a cost for producing the injected product may increase, which is undesirable.

Plastic parts for use in vehicles have been produced in a manner in which various patterns are formed on a mold through embossing processing to thus impart various textures and designs, but the aforementioned problems may occur depending on the shape of the injected product or the position of the injection gate. In the related art, a mold has been coated with a coating material to thus enable efficient flow of the resin. In order to increase durability by coating the injection mold with a coating material, a coating having high heat resistance and wear resistance and a low friction coefficient may be used. In addition, a coating material, which may be dried at a low temperature in a short time after coating of the mold therewith, has to be used. A coating material having high hardness and superior heat resistance through melamine curing or UV coating may not be suitable for the curing process after coating of a large-sized injection mold therewith.

In order to solve the problems, for example, a method of drying a coating layer formed of a silicone resin for 5 to 10 hr has been used. However, this method is disadvantageous because of the long curing time and high curing temperature for silicone reaction.

The present invention may provide a coating material to ensure durability even upon production of multiple injected products. The coating material of the present invention may have high wear resistance and heat resistance and a low friction coefficient, thus attaining releasability of the product, and may maintain a fine embossment or pattern and also to variously adjust the extent of gloss. Moreover, the coating material of the present invention may be cured within a short time.

SUMMARY OF THE INVENTION

In preferred aspects, the present invention provides a coating composition for a coating layer of an injection mold, which may exhibit improved adhesion to a mold, heat resistance and wear resistance, a low friction coefficient, and high durability.

Further, the present invention provides a method of manufacturing a coating layer of an injection mold, which may have improved adhesion to a mold, heat resistance and wear resistance, a low friction coefficient, and high durability.

In one aspect, provided is a coating composition for a coating layer of an injection mold. The coating composition may include: 100 parts by weight of a resin composition and about 30 to 40 parts by weight of a curing agent. The resin composition may include an amount of about 40 to 50 wt % of a first acrylic resin, an amount of about 5 to 15 wt % of a second acrylic resin having a weight average molecular weight less than a weight average molecular weight of the first acrylic resin, an amount of about 10 to 15 wt % of a carbon component, an amount of about 0.5 to 2 wt % of a matting agent, an amount of about 0.1 to 0.3 wt % of a catalyst, and an amount of about 20 to 35 wt % of a solvent. The wt % of the resin composition components are based on the total weight of the resin composition.

The term "matting agent" as used herein refers to a material that may modify or improve a surface property (e.g., texture, glossiness or appearance of a surface) as being applied or coated thereon. Preferred matting agent may include solid components (e.g., particle or powder) alone or in combination with liquid component (e.g., solvent or dispersion).

The term "acrylic resin" as used herein refers to a resin that contains one or more repeat units of a reacted acryl group such as acrylic acid, methacrylic acid, an acrylate ester, a methacrylate ester, other such reacted optionally substituted vinyl acid or ester monomers or compounds. An acrylic resin as referred as herein may be a homopolymer of a simple repeat of acrylic units, or a copolymer, tripolymer, tetrapolymer or other higher order polymer containing repeat units of different acrylic groups, and/or repeat units of non-acrylate groups provided that may include at least one acrylate repeat unit. Suitably, an acrylic resin may contain repeat units that comprise an acrylate group in an amount of about 5, 10, 15, 20, 25, 30, 40, 50, 60, 70, 80, 90, 95 or 100 wt % based on the total weight of the resin.

The first acrylic resin may have an acid value of about 1 to 4 mg/KOH and a hydroxyl group content of about 0.5 to 1.0%.

The term "acid value" refers to a mass of base, i.e. KOH, in mg, that is used for neutralizing one gram of a material (e.g., compounds having carboxylic acid, acidic polymers or fatty acids).

A term "hydroxyl group content" refers to a value of free hydroxyl groups in a material, which can be measured by titration or acetylation (e.g., using acetic anhydride).

The first acrylic resin may have a weight average molecular weight of about 90,000 to 110,000.

The second acrylic resin may have an acid value of about 3 to 10 mg/KOH and a hydroxyl group content of about 3 to 6%.

The second acrylic resin may have a weight average molecular weight of about 8,000 to 15,000.

Preferably, the carbon component may suitably include a carbon particle having a size of about 150 to 300 nm. Suitably carbon component materials includes, for example, graphite such as graphite powder.

The matting agent may include a particle having a size of about 1.0 to 2.0 μm.

The catalyst may include a urethane functional group. Preferably, the catalyst may be a urethane-based catalyst, which may have the urethane functional group for promoting polymerizing reactions of acrylic compounds or acrylic monomers.

The curing agent may include an amount of about 90 to 99 wt % of hexamethylene diisocyanate and an amount of about 1 to 10 wt % of a silicone-based curing agent including isophorone diisocyanate and triethoxysilane. The silicone-based curing agent may suitably be synthesized from isophorone diisocyanate and triethoxysilane.

The solvent may include at least one of an ester-based solvent or a ketone-based solvent.

The term "ester-based solvent" as used herein may include one or more ester group (—C(O)—O—). Exemplary ester-based solvent may include, but not be limited to, ethyl acetate, ethyl acetoacetate, ethyl butyrate, isopropyl acetate, methyl acetate, butyl acetate, or benzyl benzoate.

The term "ketone-based solvent" as used herein may include one or more ester group (—C(O)—). Exemplary ester-based solvent may include, but not be limited to, acetone, ethyl isopropyl ketone, acetophenone, butanone, cyclopentanone, or methyl isobutyl ketone.

In another aspect, provided is a method of manufacturing a coating layer of an injection mold. The method may include steps of: preparing a coating composition including 100 parts by weight of a resin composition and about 30 to 40 parts by weight of a curing agent, applying the coating composition on the injection mold, and curing the coating composition. The resin composition may include an amount of about 40 to 50 wt % of a first acrylic resin, an amount of about 5 to 15 wt % of a second acrylic resin having a weight average molecular weight less than a weight average molecular weight of the first acrylic resin, an amount of about 10 to 15 wt % of a carbon component, an amount of about 0.5 to 2 wt % of a matting agent, an amount of about 0.1 to 0.3 wt % of a catalyst, and an amount of about 20 to 35 wt % of a solvent, based on the total weight of the resin composition.

The curing may be performed at a temperature of about 80 to 100° C. for about 30 to 40 min using IR light.

The coating composition may be applied by spraying. The method may further include admixing the coating composition with about 150 to 200 parts by weight of the solvent based on 100 parts by weight of the resin composition before applying the coating composition on the injection mold.

The curing agent may suitably include an amount of about 90 to 99 wt % of hexamethylene diisocyanate and an amount of about 1 to 10 wt % of a silicone-based curing agent comprising isophorone diisocyanate and triethoxysilane, based on the total weight of the curing agent.

The solvent may suitably include at least one of an ester-based solvent or a ketone-based solvent.

The first acrylic resin may suitably have an acid value of about 1 to 4 mg/KOH and a hydroxyl group content of about 0.5 to 1.0%. The first acrylic resin may suitably have a weight average molecular weight of about 90,000 to 110,000.

The second acrylic resin may suitably an acid value of about 3 to 10 mg/KOH and a hydroxyl group content of about 3 to 6%. The second acrylic resin may suitably have a weight average molecular weight of about 8,000 to 15,000.

Further provided is an injection mold including the coating composition as described herein.

Still provided is a vehicle including the injection mold as described herein.

According to various exemplary embodiments of the present invention, the coating material for a coating layer of an injection mold may have improved adhesion to a mold, heat resistance and wear resistance, a low friction coefficient, and high durability.

In addition, the method of manufacturing a coating layer of an injection mold may form a coating layer of an injection mold having improved adhesion to a mold, heat resistance and wear resistance, a low friction coefficient, and high durability.

BRIEF DESCRIPTION OF DRAWING

FIG. 1 is a flowchart schematically showing an exemplary process of manufacturing an exemplary coating layer of an exemplary injection mold according to an exemplary embodiment of the present invention.

DETAILED DESCRIPTION

The above and other aspects, features and advantages of the present invention will be more clearly understood from the following preferred embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As used herein, the term "A-based" may mean that a compound corresponding to "A" or a derivative of "A" may be contained in a compound. The term "derivative" refers to a compound modified from a parent compound through the introduction of a functional group, oxidation, reduction, substitution of an atom, and the like within the range in which the structure and properties of the parent compound are not changed.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a description will be given of a coating material for a coating layer of an injection mold according to an embodiment of the present invention.

In an embodiment of the present invention, the coating composition for a coating layer of an injection mold may include a resin composition and a curing agent. Heat resistance and wear resistance of the coating material may be ensured by means of the resin composition. The resin composition includes a first acrylic resin, a second acrylic resin, a carbon component, a matting agent, a catalyst and a solvent.

For instance, the resin composition may suitably include an amount of about 40 to 50 wt % of the first acrylic resin, an amount of about 5 to 15 wt % of the second acrylic resin, having a weight average molecular weight less than a weight average molecular weight of the first acrylic resin, an amount of about 10 to 15 wt % of the carbon component, an amount of about 0.5 to 2 wt % of the matting agent, an amount of about 0.1 to 0.3 wt % of the catalyst and an amount of about 20 to 35 wt % of the solvent based on the total weight of the resin composition.

The first acrylic resin may impart durability to the coating composition. The first acrylic resin may have an acid value of about 1 to 4 mg/KOH and a hydroxyl group content of about 0.5 to 1.0%. The hydroxyl group content may be about 0.5 to 1.0% based on the total weight of the first acrylic resin. The glass transition temperature of the first acrylic resin may range from about 70 to 80° C. When the glass transition temperature of the first acrylic resin falls in the above range, a coating composition for a coating layer for a vehicle, having superior adhesion and enhanced hardness, may be obtained. The first acrylic resin has a glass transition temperature of about 70 to 80° C. Given the above temperature range, the stickiness of the coating film may be minimized.

The first acrylic resin may have a weight average molecular weight of about 90,000 to 110,000. When the weight average molecular weight of the first acrylic resin falls in the above range, a coating composition for a coating layer for a vehicle, having superior adhesion and enhanced hardness, may be obtained. The first acrylic resin may have a solid content of about 30 to 40%. The solid content of the first acrylic resin may be an amount of about 30 to 40% based on the total weight of the first acrylic resin. When the solid content of the first acrylic resin falls in the above range, a coating composition for a coating layer for a vehicle, having superior adhesion and enhanced hardness, may be obtained.

The resin composition may contain an amount of about 40 to 50 wt % of the first acrylic resin. When the amount of the first acrylic resin is less than about 40 wt %, adhesion to a mold may decrease. On the other hand, when the amount thereof is greater than about 50 wt %, coating workability may decrease, and thus the coating layer may be deteriorated in an outer appearance, for example, image clarity.

For example, the first acrylic resin may be prepared in a manner in which various kinds of monomers having double bonds, such as acrylic or vinylic monomers, may be subjected to radical polymerization in a solution using a thermal decomposition initiator. Examples of the acrylic or vinylic monomers may suitably include non-functional monomers, such as methyl acrylate, ethyl acrylate, isopropyl acrylate, N-butyl acrylate, ethylhexyl acrylate, methyl methacrylate, ethyl methacrylate, butyl methacrylate, hexyl methacrylate and lauryl methacrylate, carboxyl-functional monomers, such as acrylic acid, methacrylic acid, maleic acid, itaconic acid, crotonic acid, and the like, and hydroxyl-functional monomers, such as 2-hydroxyethyl methacrylate, hydroxypropyl acrylate, 4-hydroxybutyl acrylate, 2-hydroxyethyl acrylate, and the like. Examples of the vinylic monomers may suitably include acrylamide, N-methylol acrylamide, glycidyl methacrylate, styrene, vinyl toluene, acrylonitrile, vinyl acetate, and the like.

Examples of the thermal decomposition initiator may suitably include t-butyl peroxy 2-ethylhexanoate, t-butyl peroxybenzoate, 2,2-azobis(isobutyronitrile), benzoyl peroxide, and the like. The thermal decomposition initiator may be contained in an amount of about 0.2 to 0.4 parts by weight based on the total weight of monomers. Given the above range, a resin having high molecular weight may be prepared even at a high half-life temperature.

Also, the first acrylic resin may be prepared at a temperature of about 110 to 120° C. When the preparation temperature is less than about 110° C., the reaction may not sufficiently occur. On the other hand, when the preparation temperature is greater than about 120° C., a resin having low molecular weight may result.

The second acrylic resin as used herein enhance chemical resistance and adhesion. The second acrylic resin may react with the silicone-based curing agent. The second acrylic resin may have an acid value of about 3 to 10 mg/KOH and a hydroxyl group content of about 3 to 6%. The hydroxyl group content may be about 3 to 6% based on the total weight of the second acrylic resin. When the hydroxyl group content of the second acrylic resin falls in the above range, the durability of the coating film may be ensured. The second acrylic resin has a glass transition temperature of about 60 to 70° C. When the glass transition temperature of the second acrylic resin falls in the above range, the stickiness of the coating film may be minimized.

The second acrylic resin may have a weight average molecular weight of about 8,000 to 15,000. When the weight average molecular weight of the second acrylic resin falls in the above range, the durability of the coating film may be ensured. The second acrylic resin may have a solid content of about 45 to 55%. The solid content of the second acrylic resin may be about 45 to 55% based on the total weight of the second acrylic resin. When the solid content of the second acrylic resin falls in the above range, the durability of the coating film may be ensured.

The resin composition may contain an amount of about 5 to 15 wt % of the second acrylic resin based on the total weight of the resin composition. When the amount of the second acrylic resin is less than about 5 wt %, chemical reactivity with the silicone-based curing agent may deteriorate, and thus wear resistance and injection durability may decrease. Furthermore, releasability may decrease and thus the resulting injected product may be stained. On the other hand, when the amount thereof is greater than about 15 wt %, hardness may decrease, undesirably deteriorating wear resistance and durability.

For example, the second acrylic resin may be prepared in a manner in which various kinds of monomers having double bonds, such as acrylic or vinylic monomers, may be subjected to radical polymerization in a solution using a thermal decomposition initiator. Examples of the acrylic or vinylic monomers may suitably include non-functional monomers, such as methyl acrylate, ethyl acrylate, isopropyl acrylate, N-butyl acrylate, ethylhexyl acrylate, methyl methacrylate, ethyl methacrylate, butyl methacrylate, hexyl methacrylate and lauryl methacrylate, carboxyl-functional monomers, such as acrylic acid, methacrylic acid, maleic acid, itaconic acid, crotonic acid, and the like, and hydroxyl-functional monomers, such as 2-hydroxyethyl methacrylate, hydroxypropyl acrylate, 4-hydroxybutyl acrylate, 2-hydroxyethyl acrylate, and the like. Examples of the vinylic monomers may suitably include acrylamide, N-methylol acrylamide, glycidyl methacrylate, styrene, vinyl toluene, acrylonitrile, vinyl acetate, and the like.

Examples of the thermal decomposition initiator may suitably include t-butyl peroxy 2-ethylhexanoate, t-butyl peroxybenzoate, 2,2-azobis(isobutyronitrile), benzoyl peroxide, and the like The thermal decomposition initiator may be contained in an amount of about 2 to 5 parts by weight based on the total weight of monomers. Given the above range, a resin having low molecular weight may be prepared even at a high half-life temperature.

Also, the second acrylic resin may be prepared at a temperature of about 100 to 120° C. When the preparation temperature is less than about 100° C., resin compatibility and workability may deteriorate. On the other hand, when the preparation temperature is greater than about 120° C., adhesion and heat resistance may decrease.

The carbon component as used herein may impart heat resistance and wear resistance to the coating layer. The carbon component may be provided as a carbon paste, which may include carbon particles having a size of about 150 to 300 nm. When the size of the carbon paste falls in the above range, a homogeneous distribution thereof in the coating film may be ensured, and staining may be prevented from occurring upon coating because of high dispersibility in the resin.

The resin composition may suitably include an amount of about 10 wt % to 15 wt % of the carbon component or the carbon paste based on the total weight of the resin composition. when the amount of the carbon components is less than about 10 wt %, staining may occur and heat resistance may decrease. On the other hand, when the amount thereof is greater than about 15 wt %, the durability of the coating film may decrease.

The matting agent as used herein may function to adjust the gloss of the coating material. The matting agent may suitably include particles having a size of about 1.0 to 2.0 µm. When the size of the matting agent falls in the above range, high transmittance and hydrophobic properties may be obtained to thus ensure superior dispersibility in the resin and solvent. The matting agent may include, for example, hydrophobic silica.

The resin composition may contain an amount of about 0.5 to 2 wt % of the matting agent based on the total weight of the resin composition. When the amount of the matting agent is less than about 0.5 wt %, matting effects may deteriorate. On the other hand, when the amount of the matting agent is greater than about 2 wt %, durability may decrease.

The catalyst ("reaction catalyst") may function to promote the reaction of the resin composition and the curing agent. The reaction catalyst may include, for example, a urethane-based reaction catalyst. The resin composition may include an amount of about 0.1 to 0.3 wt % of the reaction catalyst. When the amount of the reaction catalyst is less than about 0.1 wt %, the rate of reaction of the resin composition and the curing agent may not be sufficiently improved. On the other hand, when the amount of the reaction catalyst is greater than about 0.3 wt %, working life may decrease and thus workability may deteriorate.

The solvent may function to disperse the components of the resin composition and the curing agent to thus yield a coating material. The solvent may include at least one of an ester-based solvent or a ketone-based solvent. The resin composition may suitably include an amount of about 20 to 35 wt % of the solvent based on the total weight of the resin composition.

The curing agent as used herein may function to cure the coating material. The curing agent may suitably include hexamethylene diisocyanate and a silicone-based curing agent. The hexamethylene diisocyanate may provide yellowing resistance and superior weatherability. The silicone-based curing agent may react with the second acrylic resin. The silicone-based curing agent may be synthesized from isophorone diisocyanate and triethoxysilane. Thereby, releasability and a friction coefficient may decrease.

The curing agent may suitably include an amount of about 90 to 99 wt % of hexamethylene diisocyanate and an amount of about 1 to 10 wt % of the silicone-based curing agent, based on the total weight of the curing agent. Preferably, the hexamethylene diisocyanate and the silicone-based curing agent may be mixed together. When the amount of the silicone-based curing agent is less than about 1 wt %, the friction coefficient may increase upon usage, undesirably deteriorating releasability. On the other hand, when the amount thereof is greater than about 10 wt %, compatibility with the resin composition may decrease, undesirably deteriorating an outer appearance.

The coating composition may suitably include about 30 to 40 parts by weight of the curing agent based on 100 parts by weight of the resin composition. When the amount of the curing agent is less than about 30 parts by weight, coating composition may not be sufficiently cured.

The coating composition for a coating layer of an injection mold according to an exemplary embodiment of the present invention may be applied on the injection mold to form a coating layer. The coating layer may be formed using the coating composition according to an exemplary embodiment of the present invention may have improved adhesion to a mold, heat resistance and wear resistance and exhibits a low friction coefficient and high durability. The coating layer may be cured within a short time not using UV light but using IR light having a wavelength of about 700 nm to 1050 nm, thus reducing the processing time. Furthermore, the coating layer may reduce deterioration in the outer appearance upon injection, and thus a good outer appearance may be ensured upon injection without coating of the injected product with the coating composition.

Below is a description of a method of manufacturing a coating layer of an injection mold according to an exemplary embodiment of the present invention. The differences from the coating composition for a coating layer of an injection mold according to an exemplary embodiment of the present invention described above will be described in detail below, and for portions not described, reference is to be made to the above description of the coating composition for a coating layer of an injection mold.

FIG. 1 is a flowchart schematically showing an exemplary process of manufacturing an exemplary coating layer of an exemplary injection mold according to an exemplary embodiment of the present invention.

As shown in FIG. 1, the method of manufacturing the coating layer of an injection mold according to an exemplary embodiment of the present invention may include preparing a coating composition including a resin composition and a curing agent (S100), forming a coating film by applying the coating composition on an injection mold (S200), and forming a coating layer by curing the coating film (S300).

First, the coating composition is prepared (S100). In the preparation of the coating composition (S100), the resin composition may include an amount of about 40 to 50 wt % of a first acrylic resin, an amount of about 5 to 15 wt % of a second acrylic resin having a weight average molecular weight less than that of the first acrylic resin, an amount of about 10 to 15 wt % of a carbon component, an amount of about 0.5 to 2 wt % of a matting agent, an amount of about 0.1 to 0.3 wt % of a reaction catalyst and an amount of about 20 to 35 wt % of a solvent, based on the total weight of the resin composition.

In the preparation of the coating composition (S100), the first acrylic resin may increase durability of the coating composition. The first acrylic resin may have an acid value of about 1 to 4 mg/KOH and a hydroxyl group content of about 0.5 to 1.0%. The hydroxyl group content may be about 0.5 to 1.0% based on the total weight of the first acrylic resin. The first acrylic resin may have a glass transition temperature of about 70 to 80° C. When the glass transition temperature of the first acrylic resin falls in the above range, the coating composition for a coating layer for a vehicle, having superior adhesion and enhanced hardness, may be obtained. In addition, when the glass transition temperature of the first acrylic resin falls in the above range, the stickiness of the coating film may be minimized.

The first acrylic resin may have a weight average molecular weight of about 90,000 to 110,000. When the weight average molecular weight of the first acrylic resin falls in the above range, the coating composition for a coating layer for a vehicle, having superior adhesion and enhanced hardness, may be obtained. The first acrylic resin may have a solid content of about 30 to 40% based on the total weight of the first acrylic resin. When the solid content of the first acrylic resin falls in the above range, the coating composition for a coating layer for a vehicle, having superior adhesion and enhanced hardness, may be obtained.

The resin composition may suitably include an amount of about 40 to 50 wt % of the first acrylic resin based on the total weight of the resin composition. When the amount of the first acrylic resin is less than about 40 wt %, adhesion to a mold may decrease. On the other hand, when the amount thereof is greater than about 50 wt %, coating workability may decrease, and thus the coating layer may be deteriorated in an outer appearance, for example, image clarity.

The second acrylic resin may enhance chemical resistance and adhesion. In the preparation of the coating composition, the second acrylic resin may have an acid value of about 3 to 10 mg/KOH and a hydroxyl group content of about 3 to 6%. The hydroxyl group content may be about 3 to 6% based on the total weight of the second acrylic resin. When the hydroxyl group content of the second acrylic resin falls in the above range, the durability of the coating film may be ensured. The second acrylic resin has a glass transition temperature of about 60 to 70° C. When the glass transition temperature of the second acrylic resin falls in the above range, the stickiness of the coating film may be minimized.

The second acrylic resin may have a weight average molecular weight of about 8,000 to 15,000. When the weight average molecular weight of the second acrylic resin falls in the above range, the durability of the coating film may be ensured. The second acrylic resin may have a solid content of about 45 to 55% based on the total weight of the second acrylic resin. When the solid content of the second acrylic resin falls in the above range, the durability of the coating film may be ensured.

The resin composition may suitably include 5 to 15 wt % of the second acrylic resin based on the total weight of the resin composition. When the amount of the second acrylic resin is less than about 5 wt %, chemical reactivity with the silicone-based curing agent may decrease, and thus wear resistance and injection durability may deteriorate. Furthermore, releasability may decrease, and thus the resulting injected product may be stained. On the other hand, when the amount thereof is greater than about 15 wt %, hardness may decrease, undesirably deteriorating wear resistance and durability.

The carbon component may be provided as a carbon paste. The carbon component as used herein may impart heat resistance and wear resistance to the coating layer. The carbon paste may suitably include carbon particles having a size of about 150 to 300 nm. When the size of the carbon paste falls in the above range, a homogeneous distribution thereof in the coating film may be ensured, and staining may be prevented from occurring upon coating because of high dispersibility in the resin. The resin composition may suitably include an amount of about 10 wt % to 15 wt % of the carbon component based on the total weight of the resin composition. When the amount of the carbon component is less than about 10 wt %, staining may occur and heat resistance may decrease. On the other hand, when the amount thereof is greater than about 15 wt %, the durability of the coating film may decrease.

The matting agent may function to adjust the gloss of the coating composition. The matting agent may suitably include particles having a size of about 1.0 to 2.0 μm. When the size of the matting agent falls in the above range, high transmittance and hydrophobic properties may be obtained, thus ensuring superior dispersibility in the resin and solvent. The matting agent may include, for example, hydrophobic silica, or silica particles. The resin composition may suitably include an amount of about 0.5 to 2 wt % of the matting agent. When the amount of the matting agent is less than about 0.5 wt %, matting effects may deteriorate. On the other hand, when the amount of the matting agent is greater than about 2 wt %, durability may decrease.

The reaction catalyst may function to promote the reaction of the resin composition and the curing agent. The reaction catalyst may include, for example, a urethane-based reaction catalyst. The resin composition may suitably include an amount of about 0.1 to 0.3 wt % of the reaction catalyst based on the total weight of the resin composition. When the amount of the reaction catalyst is less than about 0.1 wt %, the rate of reaction of the resin composition and the curing agent may not be sufficiently improved. On the other hand, when the amount of the reaction catalyst is greater than about 0.3 wt %, working life may decrease and thus workability may deteriorate.

The solvent may function to disperse the components of the resin composition and the curing agent to thus yield a coating composition. The solvent may include at least one of an ester-based solvent or a ketone-based solvent. The resin composition may suitably include an amount of about 20 to 35 wt % of the solvent based on the total weight of the resin composition.

The curing agent may cure the coating composition. The curing agent may suitably include hexamethylene diisocyanate and a silicone-based curing agent. The hexamethylene diisocyanate may provide yellowing resistance and superior weatherability. The silicone-based curing agent may react with the second acrylic resin. The silicone-based curing agent may be synthesized from isophorone diisocyanate and triethoxysilane. Thereby, releasability and a friction coefficient may decrease.

The curing agent may suitably include an amount of about 90 to 99 wt % of hexamethylene diisocyanate and an amount of about 1 to 10 wt % of the silicone-based curing agent, based on the total weight of the curing agent. The hexamethylene diisocyanate and the silicone-based may be suitably mixed together. When the amount of the silicone-based curing agent is less than about 1 wt %, a friction coefficient may increase upon usage, undesirably deteriorating releasability. On the other hand, when the amount thereof is greater than about 10 wt %, compatibility with the resin composition may decrease, undesirably deteriorating an outer appearance.

The coating composition may include about 30 to 40 parts by weight of the curing agent based on 100 parts by weight of the resin composition. When the amount of the curing agent is less than about 30 parts by weight, it is difficult to sufficiently cure the coating composition.

The coating composition may be applied on the injection mold, thus forming a coating film (S200). The formation of the coating film (S200) may be performed by spraying the coating composition.

Here, the coating composition may be diluted by further addition of a solvent in an amount of 150 to 200 parts by weight based on 100 parts by weight of the resin composition, after which the diluted coating composition may be applied to thus form the coating film. The use of the diluted coating composition may improve workability and may facilitate spray coating.

The coating film is cured, thus forming a coating layer (S300). The formation of the coating layer (S300) may be performed by curing the coating film at 80 to 100° C. for 30 to 40 min using IR light. If the processing conditions have values less than the above lower limits, curing may not be sufficiently performed. On the other hand, if the processing conditions have values exceeding the above upper limits, the durability of the injection mold or coating layer may become problematic.

The coating layer, formed by the method of manufacturing a coating layer of an injection mold according to an embodiment of the present invention, is improved in adhesion to a mold, heat resistance and wear resistance and exhibits a low friction coefficient and high durability. The coating layer may be cured within a short time not using UV light but using IR light, thus reducing the processing time. Furthermore, the coating layer is able to reduce deterioration in the outer appearance upon injection, and thus a good outer appearance may be ensured upon injection without coating of the injected product with the coating composition.

EXAMPLE

A better understanding of the present invention will be given through the following specific examples, which are merely set forth to illustrate the present invention but are not to be construed as limiting the scope of the present invention.

Examples 1 to 3 and Comparative Examples 1 to 5

Each coating composition including a resin composition and a curing agent was prepared using components in the amounts shown in Table 1 below.

Further, the coating composition was diluted by further addition of 150 to 200 parts by weight of a solvent based on 100 parts by weight of the resin composition, after which the diluted coating composition was sprayed, thus forming a coating film having a thickness of 5 to 6 μm on an injection mold.

The coating film was cured at a temperature of 80° C. for 30 min, thereby forming a coating layer.

TABLE 1

| | Main agent [wt %] | | | | | | | Curing agent [parts by weight] | |
|---|---|---|---|---|---|---|---|---|---|
| No. | First acrylic resin | Second acrylic resin | Carbon paste | Matting agent | Reaction catalyst | Solvent | HDI | HDI + silicone-based curing agent | |
| Comparative Example 1 | 35 | 10 | 12 | 1 | 0.1 | 41.9 | — | 33.3 |
| Comparative Example 2 | 55 | 10 | 12 | 1 | 0.1 | 21.9 | — | 33.3 |
| Comparative Example 3 | 45 | 20 | 12 | 1 | 0.1 | 21.9 | — | 33.3 |
| Comparative Example 4 | 45 | 0 | 12 | 1 | 0.1 | 41.9 | — | 33.3 |
| Comparative Example 5 | 45 | 10 | 12 | 1 | 0.1 | 31.9 | 33.3 | — |
| Example 1 | 40 | 15 | 12 | 1 | 0.1 | 31.9 | — | 33.3 |
| Example 2 | 45 | 10 | 12 | 1 | 0.1 | 31.9 | — | 33.3 |
| Example 3 | 50 | 5 | 12 | 1 | 0.1 | 31.9 | — | 33.3 |

In Table 1, "HDI+silicone-based curing agent" indicates a mixture including 97 wt % of hexamethylene diisocyanate with 3 wt % of a compound synthesized from isophorone diisocyanate and triethoxysilane.

Measurement of Properties

1. Evaluation of Outer Appearance

Surface smoothness of a coating layer was evaluated.

2. Adhesion

A coating film on a substrate was cross-cut using a cutter to form 100 squares having a size of 2 mm×2 mm, after which a piece of adhesive cellophane tape was attached to the surface thereof and then rapidly detached therefrom at 90°, followed by counting the number of remaining squares.

3. Hardness

Hardness was measured using a pendulum hardness tester. Whether hardness was ensured was evaluated upon 70 or more reciprocating motions.

4. Wear Resistance

Reciprocating wear was applied 20,000 times at a rate of 60 times/min under a load of 2 kg using a reciprocating wear tester, after which whether the substrate was exposed was evaluated.

5. Evaluation of Durability

Using a test mold (a severe test mold upon removal of an injected product at a removal angle of 0 to 20°), the wear distance (30 mm or less) of the mold coating layer after injection 150 times and the time point of peeling depending on the number of injection processes were evaluated.

acrylic resin was low, adhesion deteriorated and hardness, wear resistance and injection durability decreased. In contrast, when the amount of the first acrylic resin was high, spraying workability deteriorated, and thus the outer appearance of the injected product became poor due to non-uniform thickness of the coating layer.

3. Comparative Examples 3 and 4

Comparative Examples 3 and 4 show the results of evaluation of reliability depending on the amount of the second acrylic resin. As the amount of the second acrylic resin was increased, the amount of the first acrylic resin was decreased and thus hardness was decreased, undesirably deteriorating wear resistance and durability. In contrast, when the amount of the second acrylic resin was decreased, chemical reactivity with the silicone-based curing agent was deteriorated, thus lowering wear resistance and injection durability. Moreover, releasability was decreased, and thus the injected product was stained.

4. Comparative Example 5

Upon using a typical HDI isocyanate curing agent, wear resistance was decreased with an increase in friction coefficient. Also, durability was deteriorated due to high friction upon evaluation of injection durability, and releasability was decreased, and thus the injected product was stained.

TABLE 2

| | | | | | Evaluation of durability (test mold) | |
| --- | --- | --- | --- | --- | --- | --- |
| No. | Adhesion | Pendulum hardness | Wear resistance (load of 2 kg, reciprocating wear 20,000 times) | Outer appearance of injected product | Time point of peeling (number of injection processes) | Wear distance after injection 500 times (mm) |
| Comparative Example 1 | Poor | 57 | Poor | Good | 60 | 60 |
| Comparative Example 2 | Good | 79 | Good | Poor | 160 | 20 |
| Comparative Example 3 | Good | 62 | Poor | Good | 110 | 45 |
| Comparative Example 4 | Good | 76 | Poor | Poor | 100 | 50 |
| Comparative Example 5 | Good | 77 | Poor | Poor | 90 | 50 |
| Example 1 | Good | 75 | Good | Good | 160 | 13 |
| Example 2 | Good | 77 | Good | Good | 170 | 10 |
| Example 3 | Good | 79 | Good | Good | 160 | 18 |

Test Results

1. Examples 1, 2 and 3

In the coating composition, the first acrylic resin and the second acrylic resin were used in appropriate amounts and the silicone-based curing agent was contained therein, thus ensuring high hardness and wear resistance of the coating layer. By virtue of these properties, the time point of peeling of the coating layer was increased upon evaluation of injection durability, and the wear distance of the coating layer was reduced.

2. Comparative Examples 1 and 2

When the first acrylic resin was used in different amounts, in Comparative Example 1, in which the amount of the first Although exemplary embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:

1. A coating composition for a coating layer of an injection mold, comprising:

100 parts by weight of a resin composition; and about 30 to 40 parts by weight of a curing agent, wherein the resin composition comprises:

an amount of about 40 to 50 wt % of a first acrylic resin;

an amount of about 5 to 15 wt % of a second acrylic resin having a weight average molecular weight less than a weight average molecular weight of the first acrylic resin;

an amount of about 10 to 15 wt % of carbon component;

an amount of about 0.5 to 2 wt % of a matting agent;

an amount of about 0.1 to 0.3 wt % of a catalyst; and an amount of about 20 to 35 wt % of a solvent, wherein all the wt % based on the total weight of the resin composition, wherein the first acrylic resin has a weight average molecular weight of about 90,000 to 110,000.

2. The coating composition of claim 1, wherein the first acrylic resin has an acid value of about 1 to 4 mg/KOH and a hydroxyl group content of about 0.5 to 1.0 mol %.

3. The coating composition of claim 1, wherein the second acrylic resin has an acid value of about 3 to 10 mg/KOH and a hydroxyl group content of about 3 to 6 mol %.

4. The coating composition of claim 1, wherein the second acrylic resin has a weight average molecular weight of about 8,000 to 15,000.

5. The coating composition of claim 1, wherein the carbon component comprises a carbon particle having a size of about 150 to 300 nm.

6. The coating composition of claim 1, wherein the matting agent comprises a particle having a size of about 1.0 to 2.0 μm.

7. The coating composition of claim 1, wherein the catalyst comprises a urethane-based catalyst.

8. The coating composition of claim 1, wherein the curing agent comprises an amount of about 90 to 99 wt % of hexamethylene diisocyanate and an amount of about 1 to 10 wt % of a silicone-based curing agent comprising isophorone diisocyanate and triethoxysilane, based on the total weight of the curing agent.

9. The coating material of claim 1, wherein the solvent comprises at least one of an ester-based solvent and a ketone-based solvent.

10. A method of manufacturing a coating layer of an injection mold, comprising:

preparing a coating composition comprising 100 parts by weight of a resin composition and about 30 to 40 parts by weight of a curing agent;

applying the coating composition on the injection mold; and curing the coating composition, wherein the resin composition comprises an amount of about 40 to 50 wt % of a first acrylic resin, an amount of about 5 to 15 wt % of a second acrylic resin having a weight average molecular weight less than a weight average molecular weight of the first acrylic resin, an amount of about 10 to 15 wt % of a carbon component, an amount of about 0.5 to 2 wt % of a matting agent, an amount of about 0.1 to 0.3 wt % of a reaction catalyst, and an amount of about 20 to 35 wt % of a solvent, wherein all the wt % are based on the total weight of the resin composition, wherein the first acrylic resin has a weight average molecular weight of about 90,000 to 110,000.

11. The method of claim 10, wherein the curing the coating film is performed at a temperature of about 80 to 100° C. for about 30 to 40 min using a light having a wavelength of about 700 to 1050 nm.

12. The method of claim 10, wherein the coating composition is applied on the injection mold by spraying.

13. The method of claim 12, further comprising admixing the coating composition with about 150 to 200 parts by weight of the solvent based on 100 parts by weight of the resin composition before the applying the coating composition on the injection mold.

14. The method of claim 10, wherein the curing agent comprises an amount of about 90 to 99 wt % of hexamethylene diisocyanate and an amount of about 1 to 10 wt % of a silicone-based curing agent comprising isophorone diisocyanate and triethoxysilane, based on the total weight of the curing agent.

15. The method of claim 10, wherein the solvent comprises at least one of an ester-based solvent or a ketone-based solvent.

16. The method of claim 10, wherein the first acrylic resin has an acid value of about 1 to 4 mg/KOH and a hydroxyl group content of about 0.5 to 1.0%.

17. The method of claim 10, wherein the second acrylic resin has an acid value of about 3 to 10 mg/KOH and a hydroxyl group content of about 3 to 6%.

18. The method of claim 10, wherein the second acrylic resin has a weight average molecular weight of about 8,000 to 15,000.

\* \* \* \* \*